United States Patent Office 3,319,550
Patented May 16, 1967

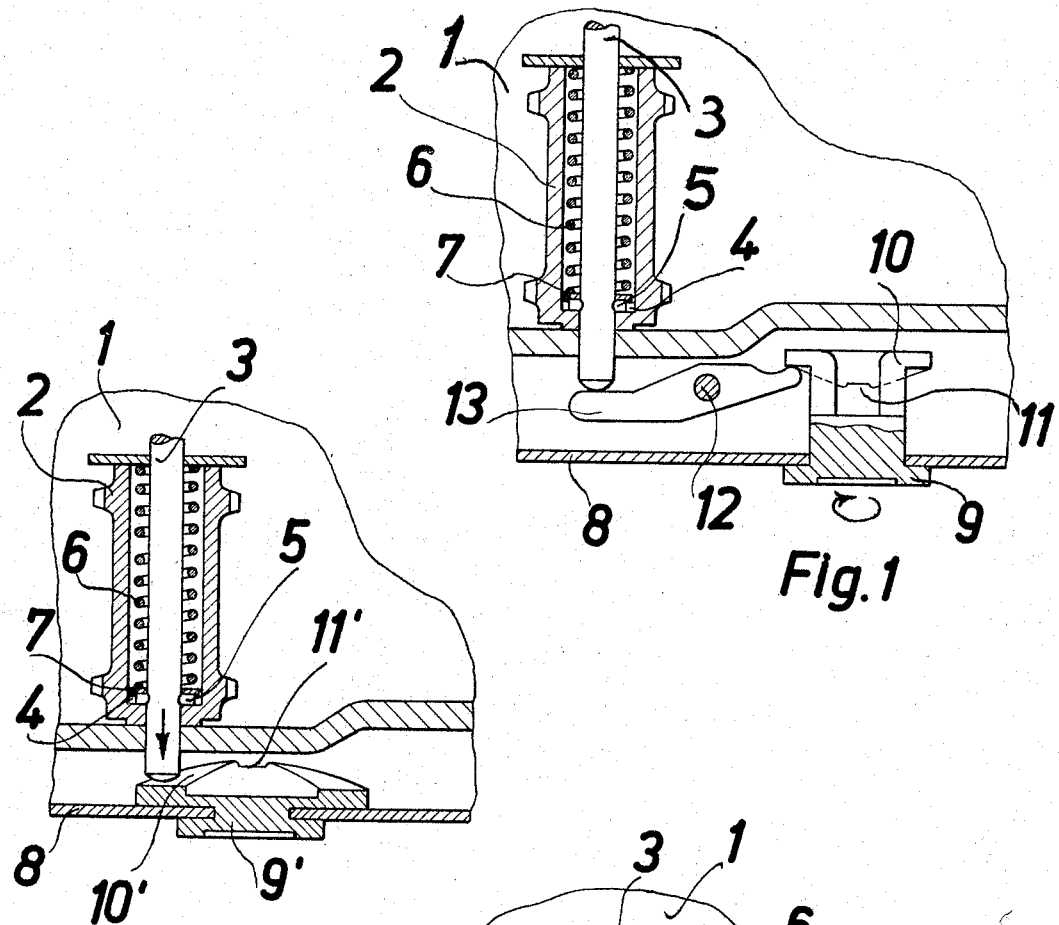
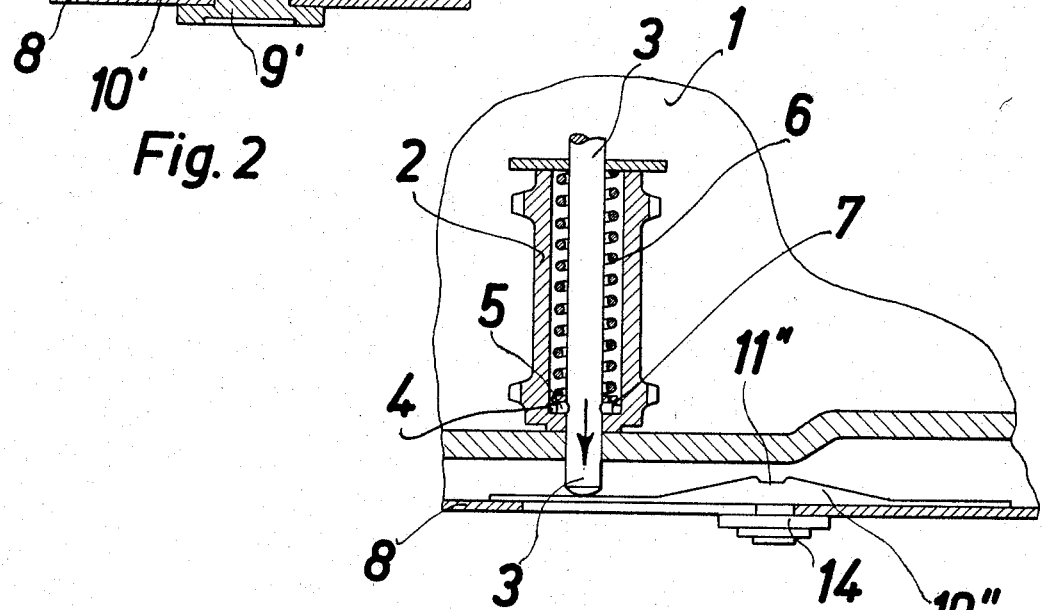

3,319,550
PHOTOGRAPHIC CAMERAS HAVING A DEVICE FOR LOCKING ITS FILM LOADING APERTURE AND A DEVICE FOR DISENGAGING THE FILM
Werner Broche, Jena, Germany, assignor to VEB Carl Zeiss Jena, Jena, Germany
Filed Aug. 21, 1964, Ser. No. 391,340
4 Claims. (Cl. 95—31)

This invention relates to a device for the disengagement of perforated-film feed sprockets in photographic cameras.

The hitherto known cameras have on their housing a disengaging push-button which underlies the annoying necessity of having to be kept pressed down by hand all the time the film is being rewound. If the operator in the course of such rewinding happens to lessen the pressure on that button, the film may be damaged or torn away from its attachment. Another disadvantage of such an outwardly protruding push-button is the constructional difficulty of sealing against leakage of light.

It is an object of the present invention to overcome the foregoing disadvantages in photographic cameras having a mechanism for locking the lid of the camera which is to be opened for inserting and removing the film, and having an axially resilient means for disengaging the film feed sprocket, which serves for transporting and rewinding perforated films.

To this end, the invention provides a means which disengages the film feed sprocket and works simultaneously with said mechanism for locking the lid. This means, which is operated by hand for opening and closing the lid of the camera, can assume two end positions, namely an open position and a closed position, and an intermediate position in which the film feed sprocket is disengaged while the camera is closed.

A particularly favorable embodiment of the invention is obtained by providing the locking mechanism with a cam body which either effects direct disengagement of the film feed sprocket or acts on the one arm of a lever the other arm of which engages and disengages the film feed sprocket according to the motion of the said body. It is furthermore advantageous to provide that each of said three positions of the locking mechanism is secured by a click stop and characterized by a symbol.

The outward appearance of the camera can be improved by providing that the device for engaging and disengaging the film feed sprocket and opening and closing the lid of the camera is a ring coaxial to the screw connecting the camera to a tripod.

In order that the invention may be more readily understood, reference is made to the accompanying drawing which illustrates diagrammatically and by way of example four embodiments thereof in longitudinal sections, FIG. 1 showing a disengaging and locking device operated by way of a rotary cam body and a lever, FIG. 2 showing a disengaging and locking device operated by a rotary cam body only.

FIG. 3 showing a disengaging and locking device operated only by a sliding cam body.

Figure 4:
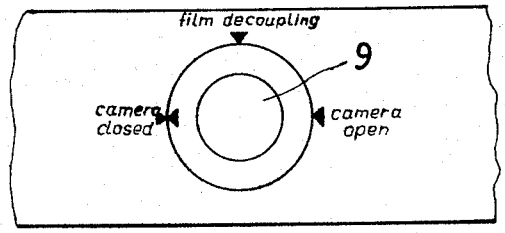

FIG. 4 showing the device according to FIG. 1 or 2 in a view from below.

Figure 5:
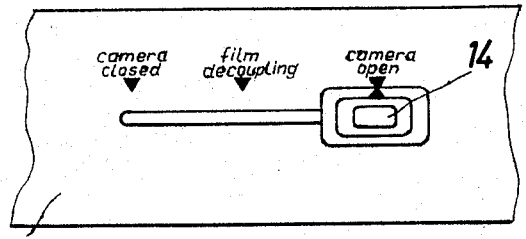

FIG. 5 showing the device according to FIG. 3, in a view from below, and

Figure 6:
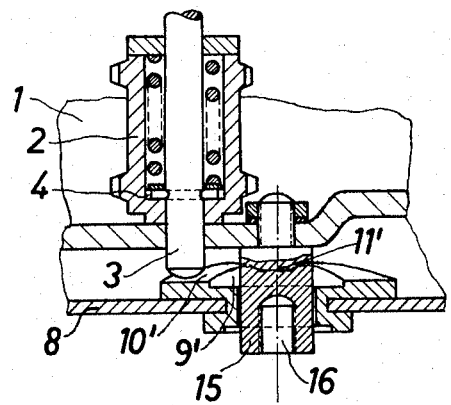

FIG. 6 showing the arrangement of a disengaging and locking device coaxial with the thread connecting the camera to a tripod.

In FIG. 1, a camera housing 1 contains a film-feed sprocket 2, which is rotated in the well known manner by means of an axle 3. Inside, the sprocket 2 has radial grooves 4 which cross each other and into which a pin 5 extending through the axle 3 is pressed by means of a spring 6 and a ring 7, thus coupling the axle 3 and the sprocket 2. The detachable back 8 of the camera has a rotary knob 9 which locks it to the housing 1 in the well known manner (not shown). That part of the knob 9 which protrudes into the housing 1 is about half its circumference in the form of a flange-like cam body 10. The cam body 10 is curved upwardly and downwardly, its deepest place having a recess 11 which serves as a clickstop. On a pivot 12 is mounted a lever 13, the two arms of which contact respectively the spherical end of the sprocket axle 3 and the cam body 10.

The knob 9 can be rotated 180°. The knob 9 in its one end position locks the back 8 to the camera housing 1 in a not shown manner, and in its other end position disengages the locking for the back 8 to be removed from the housing 1. Rotating the knob 9 clockwise causes the cam body 10 to impart clockwise motion to the lever 13, which raises the axle 3 against the pressure of the spring 6. The pin 5 is accordingly raised out of one of the grooves 4 crossing each other, the coupling between filmfeed sprocket 2 and sprocket axle 3 being disengaged for film rewinding. This position having been reached due to a rotation of 90°, the lever 13 clicks sensibly into the recess 11 and only after a further rotation to beyond the recess 11 will the locking of the back 8 be undone.

In the two embodiments shown in FIGS. 2 and 3, the same effect is obtained without the use of a two-armed lever. The parts which correspond to parts shown in FIG. 1 are referred to by corresponding numerals.

In FIG. 2, a rotary knob 9', locking the back 8 to the housing 1, is integral with a cam body 10' which has a recess 11'. Rotating the knob 9' causes the spherical end of the sprocket axle 3 to slide on the body 10' and, accordingly, to be raised and after rotation of 90° to click into the recess 11'.

The embodiment FIG. 3, has a slide lock mechanism 14 (some details of which are omitted in the drawing). Operating the mechanism 14 displaces the straight cam body 10″. Disengaging the sprocket 2 and the axle 3 is the same as described with reference to FIGS. 1 and 2, taking place as soon as the axle 3 clicks into the recess 11″.

The embodiment in FIG. 6 is similar to that shown in FIG. 2. A bolt 15 having an internal thread 16 and fast with the interior wall of the housing 1 is coaxial with and at such a distance from the rotary knob 9' that the back 8 can easily be removed from the camera housing 1 for film exchange. The internal thread 16 screws to the corresponding bolt of a tripod (not shown).

I claim:
1. A photographic camera comprising a lid for inserting and removing perforated films, a film feed sprocket, a mechanism for locking said lid and an axially resilient means for disengaging said sprocket, said means being operable together with said mechanism, said mechanism being capable of assuming two end positions, the one of said end portions being the open position and the other of said positions being the closed position, said mechanism being capable of assuming also a third position between said two end positions, said third position being for disengagement of said sprocket, each of said three positions being secured by a click stop and characterided by a symbol.

2. A photographic camera comprising a lid for inserting and removing perforated films, a film feed sprocket, a mechanism for locking said lid and an axially resilient means for disengaging said sprocket, said means being operable together with said mechanism, said mechanism being capable of assuming two end positions, the one of said end positions being the open position and the other of said positions being the closed position, said mechanism being capable of assuming also a third position between said two end positions, said third position being for disengagement of said sprocket, each of said three positions being secured by a click stop and characterized by a symbol, said mechanism being connected to a lifting cam body, said cam body acting directly on said means.

3. A photographic camera comprising a lid for inserting and removing perforated films, a film feed sprocket, a mechanism for locking said lid and an axially resilient means for disengaging said sprocket, said means being operable together with said mechanism, said mechanism being capable of assuming two end positions, the one of said end positions being the open position and the other of said positions being the closed position, said mechanism being capable of assuming also a third position between said two end positions, said third position being for disengagement of said sprocket, each of said three positions being secured by a click stop and characterized by a symbol, said mechanism being connected to a lifting cam body, said cam body acting on said disengaging means via a two-armed lever.

4. A photographic camera comprising a lid for inserting and removing perforated films, a film feed sprocket, a mechanism for locking said lid and an axially resilient means for disengaging said sprocket, said means being operable together with said mechanism, said mechanism being capable of assuming two end positions, the one of said end positions being the open position and the other of said positions being the closed position, said mechanism being capable of assuming also a third position between said two end positions, said third position being for disengagement of said sprocket, each of said three positions being secured by a click stop and characterized by a symbol, said mechanism and said means being a ring coaxial with a knob having a thread for engagement with a tripod.

References Cited by the Examiner

UNITED STATES PATENTS

| 2,766,669 | 10/1956 | Weisse et al. | 95—31 |
| 3,079,850 | 3/1963 | Goldhammer | 242—71.6 X |

FOREIGN PATENTS

| 1,249,585 | 2/1960 | France. |
| 1,109,514 | 6/1961 | Germany. |

NORTON ANSHER, *Primary Examiner.*

V. A. SMITH, R. A. WINTERCORN,
*Assistant Examiners.*